US012703572B2

(12) United States Patent
Hoffman

(10) Patent No.: US 12,703,572 B2
(45) Date of Patent: Aug. 11, 2026

(54) PHARMACEUTICAL ORDER PROCESSING SYSTEMS AND METHODS

(71) Applicant: Express Scripts Strategic Development, Inc., St. Louis, MO (US)

(72) Inventor: Robert E. Hoffman, Linden, IN (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 1131 days.

(21) Appl. No.: 17/332,615

(22) Filed: May 27, 2021

(65) Prior Publication Data

US 2022/0380127 A1 Dec. 1, 2022

(51) Int. Cl.
*B65G 1/08* (2006.01)
*B65B 1/04* (2006.01)
*B65B 37/02* (2006.01)

(52) U.S. Cl.
CPC .................. *B65G 1/08* (2013.01); *B65B 1/04* (2013.01); *B65B 37/02* (2013.01); *B65G 2201/027* (2013.01)

(58) Field of Classification Search
CPC ........... B65B 1/04; B65B 5/103; B65B 37/02; B65B 65/003; B65G 1/08; B65G 2201/027
See application file for complete search history.

(56) References Cited

U.S. PATENT DOCUMENTS 2,704,144 A * 3/1955 Stephen ............. B65G 47/1457 193/38
3,775,941 A * 12/1973 Bross ...................... B65B 5/103 221/296
5,222,855 A * 6/1993 Bernard ............... B65G 1/1371 221/9
5,379,229 A * 1/1995 Parsons ................ B65G 1/1378 700/215
5,443,346 A * 8/1995 Murata ............. H01L 21/67727 414/940
5,765,606 A * 6/1998 Takemasa ........... G07F 17/0092 141/234
6,053,359 A * 4/2000 Goulet ................... B65G 47/22 221/221
6,318,051 B1 * 11/2001 Preiss ...................... B65B 5/103 53/493
7,721,512 B2 5/2010 Siegel
7,882,680 B2 2/2011 Siegel
7,886,506 B2 * 2/2011 Knoth ...................... G07F 11/44 53/247
7,950,206 B2 * 5/2011 Knoth ...................... B65B 5/103 53/247
(Continued)

*Primary Examiner* — Gene O Crawford
*Assistant Examiner* — Kelvin L Randall, Jr.
(74) *Attorney, Agent, or Firm* — Stinson LLP

(57) ABSTRACT

A pharmaceutical order processing system for filling prescription orders in dose-based packaging includes a pathway and a plurality of individual dispensing pharmaceutical ("IDP") dispensers. The IDP dispenser dispenses pharmaceuticals one at a time and is movable along the pathway. A dose-based packager is positioned adjacent the pathway. The dose-based packager receives pharmaceuticals from one or more of the IDP dispensers when said one or more IDP dispensers are disposed adjacent the dose-based packager. The dose-based packager packages pharmaceuticals received from the one or more IDP dispensers in dose-based packaging.

21 Claims, 9 Drawing Sheets

(56) References Cited

U.S. PATENT DOCUMENTS

| | | | | |
|---|---|---|---|---|
| 8,225,582 | B2 | 7/2012 | Siegel | |
| 8,516,781 | B2 | 8/2013 | Siegel | |
| 8,950,166 | B2 | 2/2015 | Feehan | |
| 9,199,748 | B2 * | 12/2015 | Cremer | B65B 43/50 |
| 9,697,335 | B2 | 7/2017 | Joplin | |
| 10,303,854 | B2 | 5/2019 | Joplin | |
| 10,392,140 | B2 | 8/2019 | Siegel | |
| 10,427,809 | B2 | 10/2019 | Holmes | |
| 10,669,098 | B1 * | 6/2020 | Terzini | G06Q 10/08 |
| 10,916,340 | B2 | 2/2021 | Hawkes | |
| 10,934,032 | B2 | 3/2021 | Kames | |
| 2004/0256402 | A1 * | 12/2004 | Chirnomas | G07F 11/165 221/9 |
| 2004/0261357 | A1 * | 12/2004 | Takahashi | B65B 37/08 53/247 |
| 2006/0107623 | A1 * | 5/2006 | Rice | B65B 5/103 53/494 |
| 2009/0045214 | A1 * | 2/2009 | Kobayashi | G07F 17/0092 221/277 |
| 2009/0313952 | A1 * | 12/2009 | Martelli | B65B 5/103 53/244 |
| 2009/0321470 | A1 * | 12/2009 | Knoth | B65B 5/103 221/7 |
| 2010/0154354 | A1 * | 6/2010 | Singer | B65B 5/103 53/266.1 |
| 2013/0042943 | A1 * | 2/2013 | Bassani | B65B 57/20 700/242 |
| 2016/0251160 | A1 * | 9/2016 | Hawkes | B65G 1/06 221/124 |
| 2018/0263853 | A1 * | 9/2018 | Yang | B65B 57/20 |
| 2019/0161276 | A1 * | 5/2019 | Joplin | B67B 3/26 |
| 2020/0346793 | A1 | 11/2020 | Holmes | |
| 2023/0020340 | A1 * | 1/2023 | Brakkee | A61J 7/0084 |
| 2023/0260355 | A1 * | 8/2023 | Kim | B25J 9/1697 221/1 |
| 2023/0415934 | A1 * | 12/2023 | Hoffman | B25J 5/00 |

* cited by examiner

PHARMACEUTICAL ORDER PROCESSING SYSTEMS AND METHODS

FIELD

The present disclosure generally relates to pharmaceutical processing and fulfillment systems, and more particularly to pharmaceutical order processing systems for filling prescriptions and prescription orders in dose-based (e.g., dose dispensing, unit dose) packaging.

BACKGROUND

Pharmaceutical fulfillment systems process and fill a large number of prescriptions and prescription orders with pharmaceuticals. Such fulfillment systems typically fill a prescription container with a specific quantity of pharmaceuticals (e.g., 30, 60, 90 pills). If the prescription order includes multiple types of pharmaceuticals, each type of pharmaceutical is placed in its own prescription container.

SUMMARY

In one aspect, a pharmaceutical order processing system for filling prescription orders in dose-based packaging comprises a pathway and a plurality of individual dispensing pharmaceutical dispensers. At least one of the plurality of individual dispensing pharmaceutical dispensers is configured to dispense pharmaceuticals one at a time. The at least one of the plurality of individual dispensing pharmaceutical dispensers is movable along the pathway. A dose-based packager is adjacent the pathway. The dose-based packager is configured to receive pharmaceuticals from one or more of said at least one of the plurality of individual dispensing pharmaceutical dispensers when said one or more of said at least one of the plurality of individual dispensing pharmaceutical dispensers are disposed adjacent the dose-based packager. The dose-based packager is configured to package pharmaceuticals received from said one or more of said at least one of the plurality of individual dispensing pharmaceutical dispensers in dose-based packaging.

In another aspect, a method of filling prescription orders in dose base packaging comprises moving a plurality of individual dispensing pharmaceutical dispensers along a pathway to position the plurality of individual dispensing pharmaceutical dispensers adjacent a dose-based packager and packaging, with the dose-based packager, pharmaceuticals from the plurality of individual dispensing pharmaceutical dispensers in dose-based packaging.

Other objects and features of the present disclosure will be in part apparent and in part pointed out herein.

BRIEF DESCRIPTION OF THE DRAWINGS

Corresponding reference characters indicate corresponding parts throughout the drawings.

DETAILED DESCRIPTION

Figure 1:
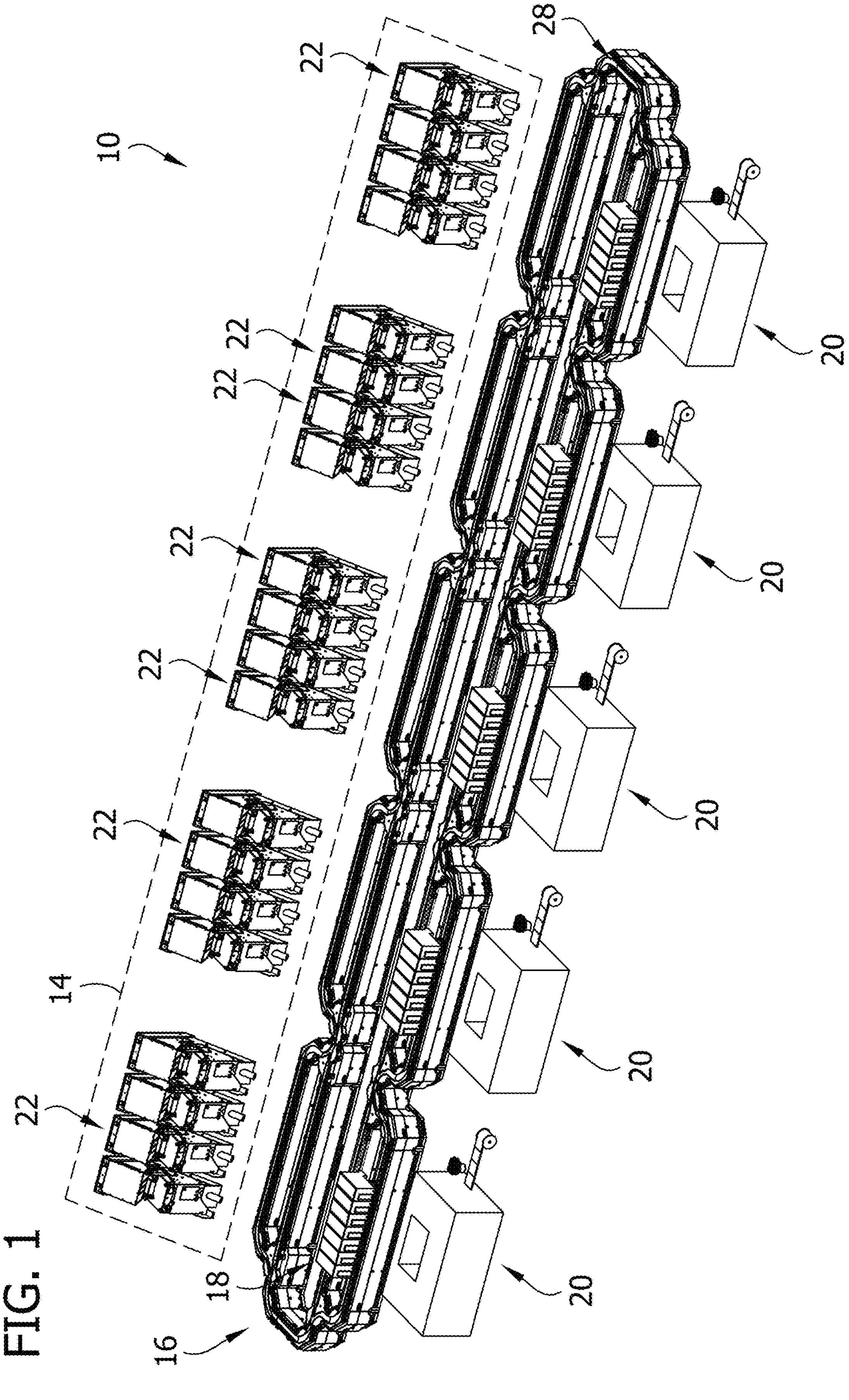
FIG. 1 is a perspective of a pharmaceutical order processing system according to one embodiment of the present disclosure.
Figure 5:
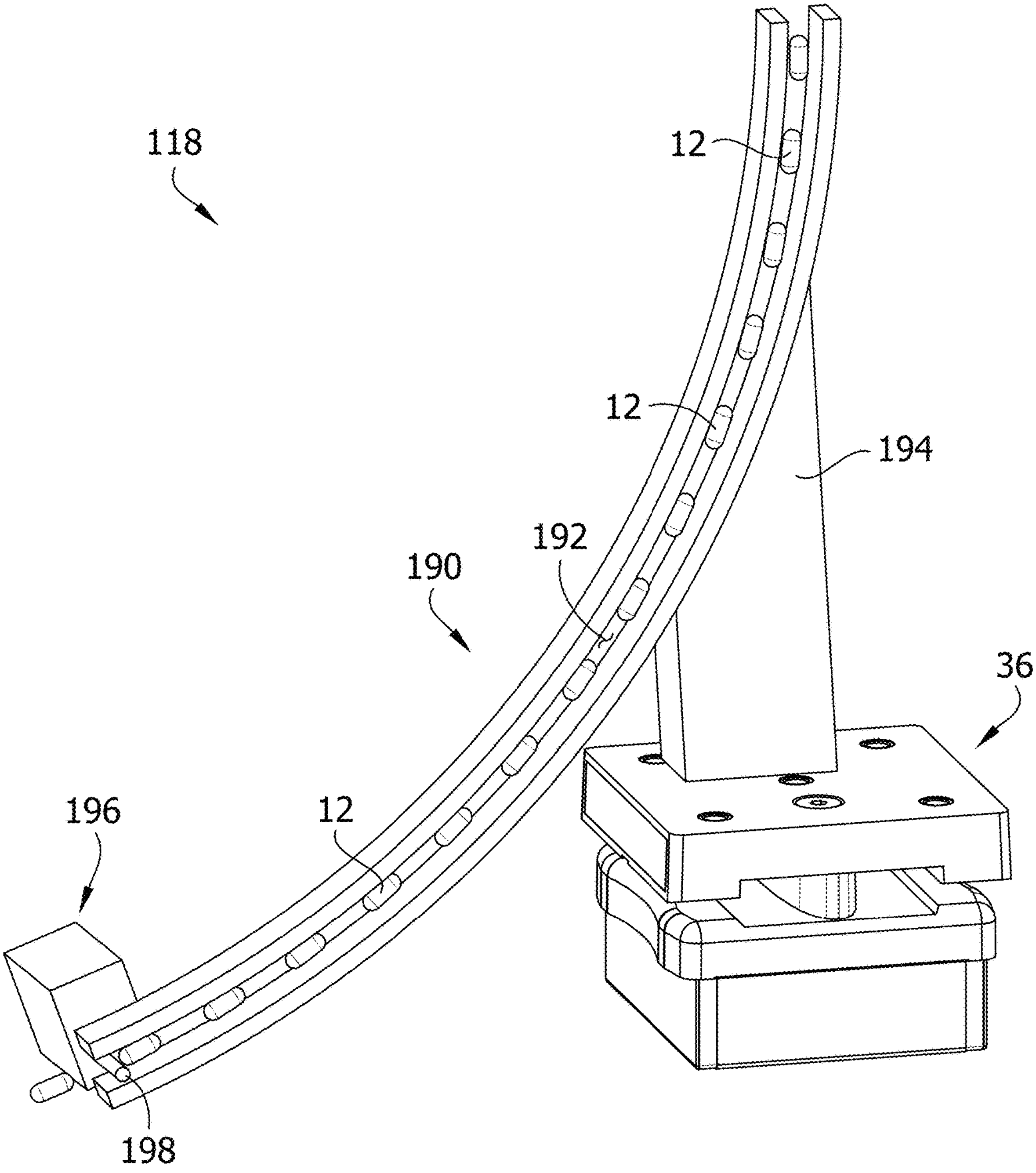
FIG. 5 is a perspective of an individual dispensing pharmaceutical dispenser of the pharmaceutical order processing system of FIG. 3.

Referring to FIG. 1, a pharmaceutical order processing system ("system") according to one embodiment of the present disclosure is generally indicated at 10. The system 10 fulfills prescription orders received by the system with pharmaceuticals 12 (FIG. 5). The prescription orders may include one or more pharmaceuticals 12 (e.g., prescription drugs) and one or more different types of pharmaceuticals. The pharmaceuticals 12 may be in the form of pills, capsules, geltabs, tablets, or the like. The system 10 is configured to fill prescription orders in dose-based packaging 62 (e.g., unit dose packaging), such as pouches although other types of packaging (e.g., blister packs) are within the scope of the present disclosure. Dose-based packaging 62 (FIG. 6) refers to packaging that groups one or more pharmaceuticals 12 that are to be taken together at generally the same time (e.g., a "dose time" such as in the morning, in the afternoon, for one day, etc.) in the same compartment within the packaging. These one or more pharmaceuticals 12 that are to be taken at the same dose time are referred herein as a dose pharmaceutical group. The dose pharmaceutical group can be one pharmaceutical 12 or multiple pharmaceuticals. The dose pharmaceutical group can be one pharmaceutical type (with one or more pharmaceuticals of said one pharmaceutical type) or multiple pharmaceutical types (with one or more pharmaceuticals for each of said pharmaceutical type). Further, the particular pharmaceuticals making up each dose pharmaceutical group can change from dose time to dose time. For example, one dose pharmaceutical group for a Monday dose time may be made up of one pharmaceutical A, two pharmaceutical B's, and one pharmaceutical C while a dose group for the same patient for a Tuesday dose time may be made up of one pharmaceutical A and one pharmaceutical D (with "A", "B", "C", and "D" identifying the different types of pharmaceuticals). By filling the prescription order in dose-based packaging 62, the system 10 is able to automatically form and individually package in separate compartments the dose pharmaceutical groups for each dose time for a patient. Thus, when the patient receives the dose-based packing 62 containing their prescription order, their prescription order is (e.g., pharmaceuticals 12 are) already sorted into dose pharmaceutical groups for the patient's dose times, with each dose pharmaceutical group being contained with its own compartment within the dose-based packaging 62.

Such sorting of pharmaceuticals is a time consuming process that has typically been done by patients in the past, who upon receiving the prescriptions of their prescription orders, sort the pharmaceuticals using pill containers that have a compartment for each dose time (e.g., day of the week, the morning and afternoon of each day, etc.). For example, if a patient is prescribed to take one pharmaceutical A, one pharmaceutical B and one pharmaceutical C on a Monday, the patient would remove one pharmaceutical A, one pharmaceutical B and one pharmaceutical C from each of their respective prescription containers (which may contain a month's supply of the pharmaceutical) and place each pill in the same compartment of the pill container designated as "Monday." The patient would repeat this for every day of the week, so that on that day, the patient need only take the pharmaceuticals (e.g., the dose pharmaceutical group) in that day's compartment.

Figure 2:
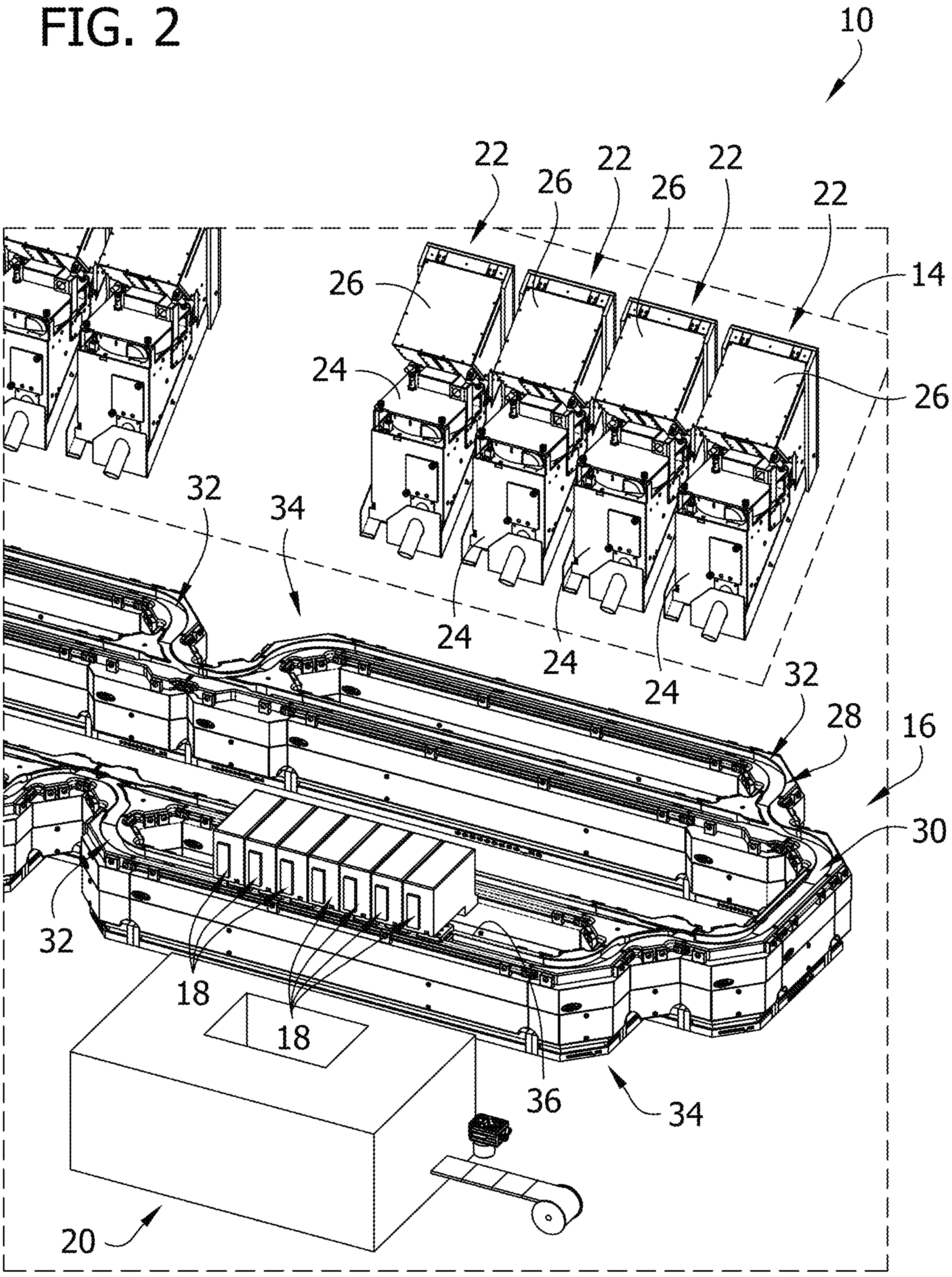
FIG. 2 is an enlarged perspective of a portion of the pharmaceutical order processing system of FIG. 1.

Referring to FIGS. 1 and 2, the system 10 includes a pharmaceutical dispensing apparatus 14, a conveyor 16, a plurality of individual dispensing pharmaceutical dispensers 18 ("IDP dispensers") and one or more dose-based packagers 20. The pharmaceutical dispensing apparatus 14 is configured to dispense the pharmaceuticals 12. Specifically, the pharmaceutical dispensing apparatus 14 holds and stores quantities of the different pharmaceutical types the system 10 can use to fill a prescription order and dispenses the pharmaceuticals 12 of each pharmaceutical type to IDP dispensers 18. For example, the pharmaceutical dispensing apparatus 14 may hold and store 20 different pharmaceutical types. In one embodiment, the pharmaceutical dispensing apparatus 14 is a high volume filler, although other types of pharmaceutical dispensing apparatuses are within the scope of the present disclosure. One example of a high volume filler is described in U.S. Pat. No. 9,697,335, which is hereby incorporated by reference in its entirety.

In the illustrated embodiment, the pharmaceutical dispensing apparatus 14 includes a plurality of bulk dispensing pharmaceutical dispensers 22 ("BDP dispensers"). Each BDP dispenser 22 is configured to dispense one pharmaceutical type (e.g., pharmaceuticals 12 of one type). Each BDP dispenser 22 includes a pharmaceutical or pill counter 24, a hopper 26, and any associated pharmaceutical plumbing (e.g., pipes, tubes, chutes, ducts, fittings, gates, valves, etc.) for dispensing the pharmaceuticals 12. The hopper 14 is configured to store a plurality of the pharmaceuticals 12 (of the same type). The pharmaceutical counter 24 is operatively coupled to the hopper 14 and is configured to count and release an exact number of pharmaceuticals 12 (e.g., a 1-month's supply, a 2-month's supply, a 3-month's supply, etc.) from the hopper to fill a prescription order. Further details on automated dispensing systems, pharmaceutical dispensers and components thereof may be found in U.S. Pat. No. 10,303,854, the entirety of which is hereby incorporated by reference. It is appreciated that the systems and components described herein can be used in other contexts besides pharmaceuticals without departing from the scope of the present disclosure.

The conveyor 16 forms a pathway 28. As described in more detail below, the IDP dispensers 18 move along the pathway 28 between different components (e.g., pharmaceutical dispensing apparatus 14, dose-based packagers 20, etc.) of the system 10. These different components (e.g., pharmaceutical dispensing apparatus 14, dose-based packagers 20, etc.) of the system 10 are adjacent the pathway 28. In the illustrated embodiment, the pathway 28 includes a main path or track 30 and a plurality of branch paths or tracks 32. The main path 30 forms a closed loop. In one embodiment, the pathway 28 may include two or more main paths 30. The main path 30 allows the IDP dispensers 18 to be repeatedly moved to different components of the system 10. Each branch path 32 is connected to the main path 30. In the illustrated embodiment, each branch path 32 includes an upstream end connected to the main path 30 and a downstream end (downstream of the upstream end relative to the main path) connected to the main path. The IDP dispensers 18 can enter a branch path 32 (from the main path 30) at the upstream end and exist the branch path (to re-enter the main path) at the downstream end. In the illustrated embodiment, each branch path 32 is adjacent another component of the system 10, such as the pharmaceutical dispensing apparatus 14 or a dose-based packager 20. The branch paths 32 allow IDP dispensers 18 to be stationed thereon while an operation involving the IDP dispensers occurs, such as receiving or dispensing pharmaceuticals 12 (as explained in more detail below), while keeping the main path 30 clear to continue to allow other IDP dispensers to move about the system 10 to other components. In the illustrated embodiment, the pathway 28 only allows direction of travel in one direction (e.g., the IDP dispensers 18 can only move in one direction (e.g., clockwise direction) along the main path 30 and branch paths 32).

In the illustrated embodiment, the conveyor 16 is generally modular and made up of conveyor modules 34 that can be combined together. Any number of conveyor modules 34 can be combined together, to increase or decrease the size of the conveyor 16 as desired. For instance, the larger the conveyor 16, the greater the capacity (e.g., number of prescription orders that can be filled in a given time) of the system 10. Each conveyor module 34 generally includes a section of the main path 30 and a branch path 32 connected to that section of the main path. Each conveyor module 34 may include a gate 40 at the upstream end of the branch path 32 that may be moved into and retracted from the section of the main path 30 to selectively guide an IDP dispenser 18 into the corresponding branch path 32 of the conveyor module 34.

The system 10 includes a plurality of carriages or pucks 36 (FIG. 5). Each carriage 36 is movably mounted on the pathway 28. Each carriage 36 supports an IDP dispenser 18. In one embodiment, the conveyor 16 (e.g., each conveyor modules 34) includes a mover, such as a conveyor belt or a series of wheels operatively connected to and driven by one or more prime movers 38 (such as an electric motors), that moves the carriages 36 along the pathway 28. The mover engages the carriages 36 to move them along the pathway 28. For example, the bottom of the pathway 28 may be defined by a conveyor belt such that the carriages 36 rest on and move with the conveyor belt. In the illustrated embodiment, the pathway 28 includes side walls. The carriages 36 (or a portion thereof) are sized and shaped to fit between the side walls, thereby keeping the carriages on the pathway 28. The conveyor 16 may include one or more sensors 46, such as proximity sensors, for determining the position of the carriages 36 (and their corresponding IDP dispenser 18) along the pathway 28. In one embodiment, the conveyor 16 may be able to individually move the carriages 36 along the pathway 28 and individually positon and hold the carriages at discrete or desired locations on the pathway, such as adjacent a dose-based packager 20. In another embodiment, the conveyor 16 may also include one or selectively engageable stops 48 for engaging, positioning, and holding a carriage 36 (and its corresponding IDP dispenser 18) at a set location on the pathway 28. For example, a stop 48 can be used to position an IDP dispenser 18 on the pathway 28 relative to the pharmaceutical dispensing apparatus 14 (e.g., one of the BDP dispensers 22). In another example, the conveyor 16 may include a plurality of stops 48 along the pathway 28 (e.g., branch path 32) adjacent each dose-based packager 20 to locate and hold one or more IDP dispensers

18 in position adjacent to the dose-based packager. The stops 48 may hold the IDP dispensers 18 in position while the movers continue to move other carriages 36 around the pathway 28. In one embodiment, the stops 48 may be selectively extendable and retractable to selectively engage and disengage, respectively, a carriage 36 (and its corresponding IDP dispenser 18). The conveyor 16 may also include one or more scanners 50, such as barcode scanners, RFID scanners, etc., positioned along the pathway 28 to identify each carriage 36 and/or its corresponding IDP dispenser 18. This information can be used to ensure each carriage 36 and corresponding IDP dispenser 18 travels to its correct destination. For example, the identity information from the scanners 50 can be used to determine whether to activate a gate 40 to divert the carriage 36 (and its corresponding IDP dispenser 18) off the main path 30 and onto a select branch path 32, such as for directing the IDP dispenser to its associated BDP dispenser 22 or to the dose-based packager 20. In one embodiment, the conveyor is the MagneMover® LITE system from Rockwell Automation, Inc. In another embodiment, the conveyor is the Montrac® Modular System from Montratec GmbH. Other types of conveyors are within the scope of the present disclosure.

Still referring to FIGS. 1 and 2, each IDP dispenser 18 is movable along the pathway 28. Each IDP dispensers 18 is mounted on or supported by one of the carriages 36. Thus, as each carriage 36 moves along the pathway 28, its corresponding IDP dispenser 18 also moves along the pathway. In general, each IDP dispenser 18 moves along the pathway 28 between the pharmaceutical dispensing apparatus 14 and a dose-based packager 20 (e.g., one of the dose-based packagers). Each IDP dispenser 18 is configured to receive pharmaceuticals 12 from the pharmaceuticals dispensing apparatus 14 (and then deliver the received pharmaceuticals to a dose-based packager 20). In particular, each IDP dispenser 18 is configured to receive pharmaceuticals 12 (e.g., a quantity of pharmaceuticals of one type) from one of the BDP dispensers 22. Desirably, each IDP dispenser 18 only receives and dispenses one type of pharmaceutical so as to avoid any cross-contamination between pharmaceutical types. To load the IDP dispenser 18 with pharmaceuticals 12, the conveyor 16 moves the IDP dispenser 18 (via the carriage 36) along the pathway 28 to the BDP dispenser 22 having the pharmaceutical type needed to fill a prescription order. Once the conveyor 16 positions the IDP dispenser 18 at the correct position on the pathway 28 (e.g., on the branch path 32), the BDP dispenser 22 dispenses the pharmaceuticals 12 to the IDP dispenser, which receives and holds the pharmaceuticals. The quantity of the dispensed pharmaceuticals 12 is desirably the quantity needed to fill a prescription order for that pharmaceutical type. After the IDP dispenser 18 is loaded up with pharmaceuticals 12, the IDP dispenser is moved by the conveyor 16, along the pathway 28, to one of the dose-based packagers 20 (e.g., to the branch path 32 associated with the dose-based packager).

The IDP dispensers 18 deliver the pharmaceuticals 12 to a dose-based packager 20. Each IDP dispenser 18 is configured to dispense pharmaceuticals 12 one at a time. Specifically, each IDP dispenser is configured to dispense pharmaceuticals 12 one at a time to one of the dose-based packagers 20. In one embodiment, the IDP dispenser 18 comprises a counting cell, such as a Baker Cell, Kerby Cell or the like. Although other configurations of the IDP dispenser are within the scope of the present disclosure.

The system 10 can include other types of IDP dispensers besides the IDP dispenser 18 illustrated. In other words, the system 10 can include multiple types of IDP dispensers, not just one type such as the IDP dispensers 18 illustrated. These other types of IPD dispensers can be similar in some respects to the functionality of the IDP dispensers 18 and different in some respects to the functionality of the IDP dispensers 18. For example, these other types of IDP dispensers may move along the pathway 28 but are manually loaded instead of being loaded by the pharmaceutical dispensing apparatus 14.

Still referring to FIGS. 1 and 2, the dose-based packagers 20 of the system 10 are positioned by the conveyor 16. The system 10 desirably includes a plurality of dose-based packagers 20. In the illustrated embodiment, each dose-based packager 20 is adjacent one of the branch paths 32 of the pathway 28 (e.g., a conveyor module 34). As mentioned above, the conveyor 16 is modular and can be expanded or reduced as desired. Accordingly, the system 10 can generally include any number of dose-based packagers 20 (by increasing or decreasing the number of conveyor modules 34). For example, the system 10 can include 50, 100 or more dose-based packagers 20 arranged around the conveyor 16 depending on the desired capacity (e.g., order filling capacity) of the system 10. The dose-based packagers 20 are arranged at locations along the pathway 28 that are spaced apart from each other. The dose-based packagers 20 are also arranged at locations along the pathway 28 that are spaced apart from the pharmaceutical dispensing apparatus 14.

The dose-based packagers 20 are all generally the same, so one dose-based packager will now be described with the understanding the description applies to all dose-based packagers of the system 10. The dose-based packager 20 is configured to receive pharmaceuticals 12 from one or more of the IDP dispenser 18 when the IDP dispensers are disposed adjacent the dose-based packager. Specifically, when the IDP dispensers 18 are stationed at the branch path 32 corresponding to the dose-based packager 20. Thus, the IDP dispensers 18 dispense the pharmaceuticals 12 to the dose-based packager 20. The dose-based packager 20 is configured to package the pharmaceuticals 12 received from the one or more IDP dispensers 18 in the dose-based packaging 62.

The dose-based packager 20 is able to process or package one prescription order at a time. The dose-based packager 20 is configured to receive each dose pharmaceutical group from one or more of the IDP dispensers 18 and package each dose pharmaceutical group in its own compartment in the dose-based packaging 62. In other words, the IDP dispensers 18 dispense the pharmaceuticals 12 to the dose-based packager 20 in dose pharmaceutical groups. For example, the dose-based packager 20 is configured to receive one or more pharmaceuticals 12 (e.g., a dose pharmaceutical group) from one or more IDP dispensers 18 during a first period of time (e.g., about 0.5-1 second). All the pharmaceuticals 12 dispensed by the one or more IDP dispensers 18 and received by the dose-based packager 20 during the first period of time are a dose pharmaceutical group. Desirably, each IDP dispenser 18 is configured to only dispense one pharmaceutical 12 during the first period of time. The dose-based packager 20 is configured to package the one or more pharmaceuticals 12 received during the first period of time together in the dose-based packaging 62. This process repeats (e.g., the dose-based packager 20 receives a second dose pharmaceutical group during a second period of time and so on) for each dose pharmaceutical group until every dose pharmaceutical group of the prescription order is packaged in the dose-based packaging 62.

Figure 7:
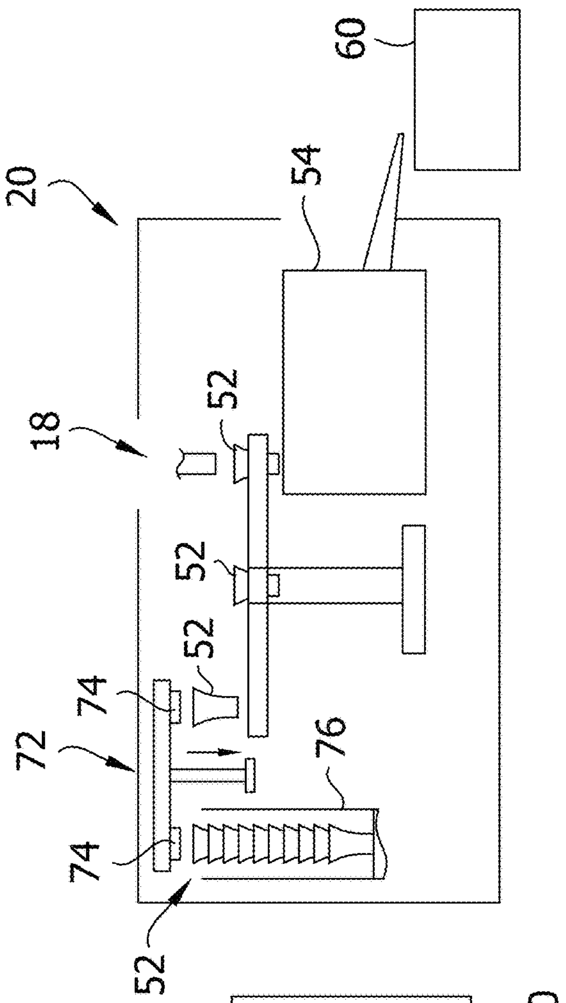
FIG. 7 is a side cross-sectional illustration of the dose base packager.
Figure 6:
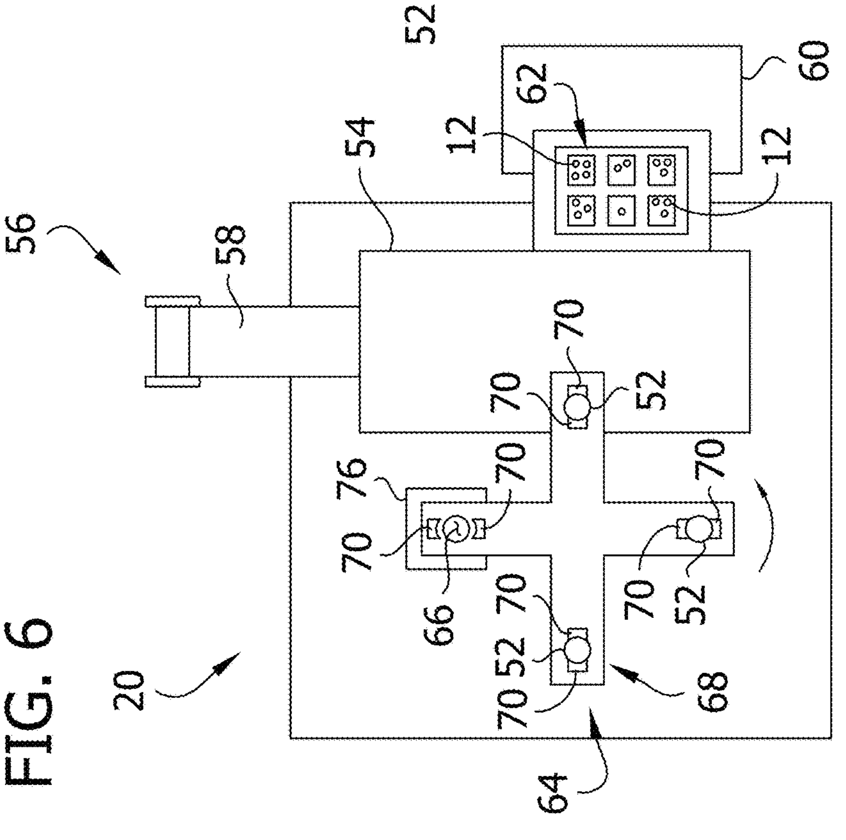
FIG. 6 is a plan cross-sectional illustration of a dose base packager of the pharmaceutical order processing systems of FIGS. 1 and 3.

Referring to FIGS. 6 and 7, one embodiment of a dose-based packager 20 is illustrated in more detail. In this embodiment, the dose-based packager 20 includes a disposable guide 52 configured to guide the pharmaceuticals 12 to the dose-based packaging 62. Desirably, the disposable guide 52 is the only element of the dose-based packager 20 that comes into contact with the pharmaceuticals 12, as the pharmaceuticals move from the IDP dispensers 18 to the dose-based packaging 62. This way, once a prescription order has been packaged (e.g., all the dose pharmaceutical groups are packaged in the dose-based packaging 62), the disposable guide 52 can be discarded and replaced with a new disposable guide for the next prescription order to be packaged by the dose-based packager 20. This eliminates any cross-contamination between the pharmaceuticals 12 of different prescription orders and allows the dose-based packager 20 to package prescription orders without having to be cleaned between each prescription order.

In the illustrated embodiment, the disposable guide 52 is a funnel, although other shapes and configurations of the disposable guide are within the scope of the present disclosure. The funnel 52 is large enough to receive or collect the pharmaceuticals 12 from the one or more IDP dispensers 18 positioned adjacent the dose-based packager 20. As illustrated in FIG. 7, an outlet of each IDP dispenser 18 is aligned (e.g., vertically positioned above) the funnel 52 so that the pharmaceuticals 12 dispensed by the IDP dispensers 18 flow into the funnel. The funnel 52 (broadly, the disposable guide) directs the pharmaceuticals 12 into a poucher 54 of the dose-based packager 20 which packages the pharmaceuticals in the dose-based packaging 62. In the illustrated embodiment, the dose-based packager 20 includes a roll 56 of film 58 (broadly, a dose-based packaging material) that the poucher 54 uses to create the dose-based packaging 62 containing the pharmaceuticals 12. For example, the poucher 54 may include a heat sealer that joins two layers of the film 58 together to seal each dose pharmaceutical group in a compartment defined by the two layers of film. Other packaging systems are within the scope of the present disclosure. After packing the pharmaceuticals 12 in the dose-based packaging 62, the dose-based packaging leaves the poucher 54. In the illustrated embodiment, the dose-based packaging 62 is collected by a collection bin 60 for further processing. In other embodiments, the dose-based packaging 62 may be automatically transferred to a bagger (not shown) which may combine the dose-based packaging with product literature, add patient specific information to the dose-based packaging and/or package the dose-based packaging (and product literature) in a shipping package in order to be shipped to the patient. In one embodiment, the dose-based packager 20 may be able to add patient information to the dose-based packaging 62 (e.g., include a printer, label maker, etc.). For example, the dose-based packager 20 may add information about each compartment in the dose-based packaging 62, such as what pharmaceuticals 12 are included in the compartment and when the pharmaceuticals in the compartment are to be taken (e.g., a dose time). In one embodiment, the dose-based packager 20 includes a pharmaceutical receiving sensor (not shown), such as a proximity sensor, configured to sense the presence or movement of pharmaceuticals 12 thereby. The receiving sensor is arranged on the dose-based packager 20 to detect the presence of the pharmaceuticals 12 when the pharmaceuticals are received from the IDP dispenser(s) 18 to confirm that the dose-based packager received the pharmaceuticals from the IDP dispenser(s). In another embodiment, instead of a sensor, the dose-based packager 20 can includes a pharmaceutical receiving camera.

The dose-based packager 20 includes a guide mover 64 that moves the disposable guide 52 (e.g., funnel). The guide mover 64 includes a plurality of arms (e.g., four arms) that rotate about an axis of rotation. Each arm includes an opening 66 sized and shaped to permit the disposable guide 52 to move therethrough and a gripper 68 aligned with the opening. The gripper 68 includes two movable jaws 70 movable between a holding position and a release position. In the holding position, the two jaws 70 are positioned to grip and hold the disposable guide 52. In the release position, the two jaws 70 are positioned to permit the disposable guide 52 to move (e.g., fall) therebetween and through the opening 66. A prime mover 78, such as a linear actuator, may move the jaws toward each other to the holding position and away from each other to the release position. The dose-based packager 20 also includes a guide picker 72 that may include suction cups 74 that selectively grab and release a disposable guide 52. The guide picker 72 picks a new, clean disposable guide 52 from a guide hopper 76 and moves (e.g., rotates) the new disposable guide to the guide mover 64. The guide picker 72 (e.g., suction cup 74) then releases the disposable guide 52, which falls between and is held by one of the grippers 68, with the jaws 70 in the holding position (e.g., a loading position). The guide mover 64 then rotates about 90 degrees to move the disposable guide 52 to a staging position and then rotates about 90 degrees again to move the disposable guide to a filling position, where the disposable guide directs the pharmaceuticals 12 from the IDP dispensers 18 to the poucher 54. After the prescription order has been packaged, the guide mover 64 rotates the disposable guide 52 about 90 degrees to a discard position, where the jaws 70 move to the release position, releasing the disposable guide which falls though the opening 66 and into a waste bin 76. The guide mover 64 then moves the arm back to the loading position and the process repeats. One or more prime movers 80, such as electric motors, may move the guide mover 64 and guide picker 72. It is understood that the operations at each position (e.g., loading position, staging position, filling position, discard position) can occur simultaneously for disposable guides at each position. Other configurations of the guide mover and guide picker are within the scope of the present disclosure.

Figure 3:
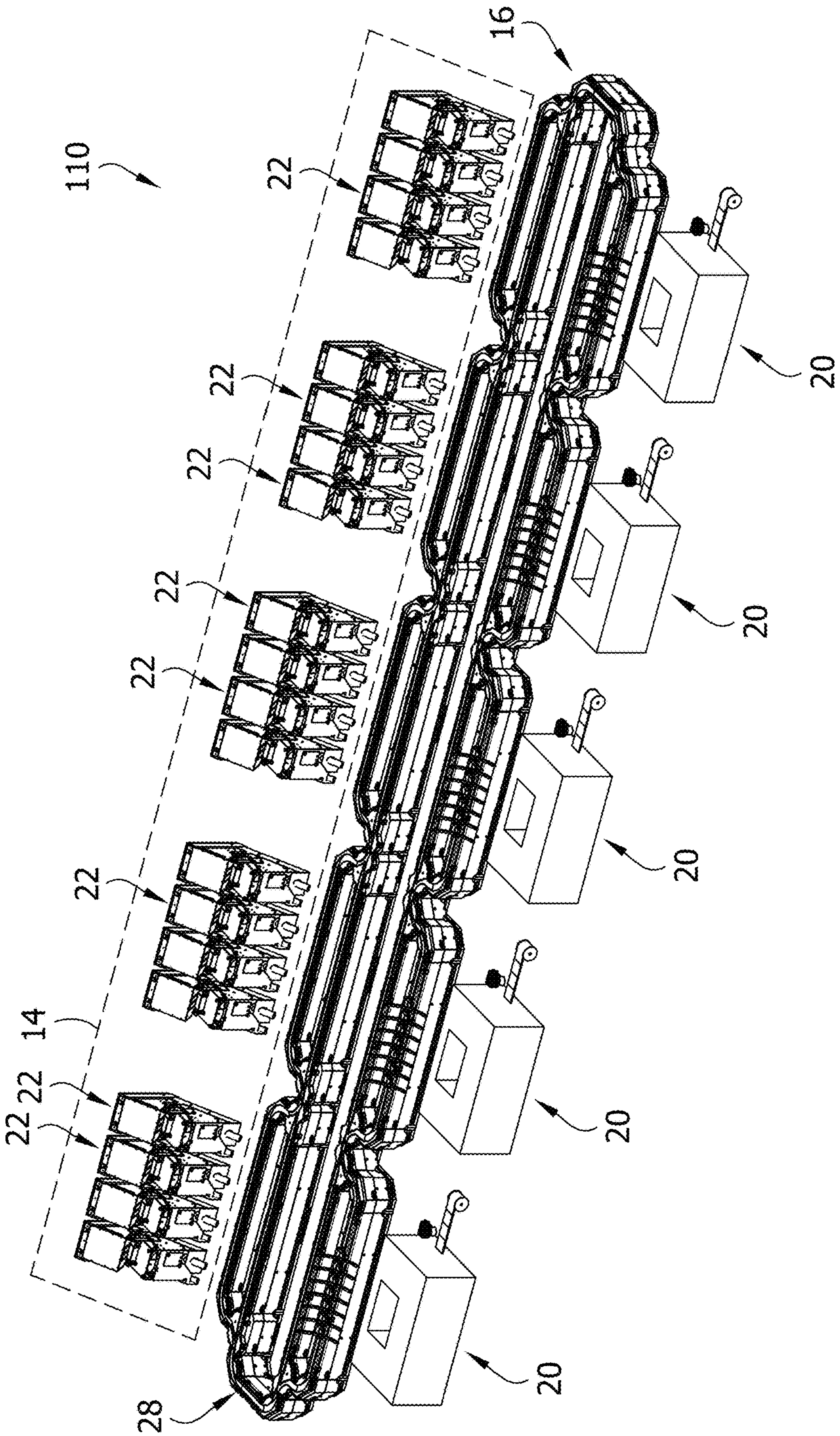
FIG. 3 is a perspective of a pharmaceutical order processing system according to another embodiment of the present disclosure.
Figure 4:
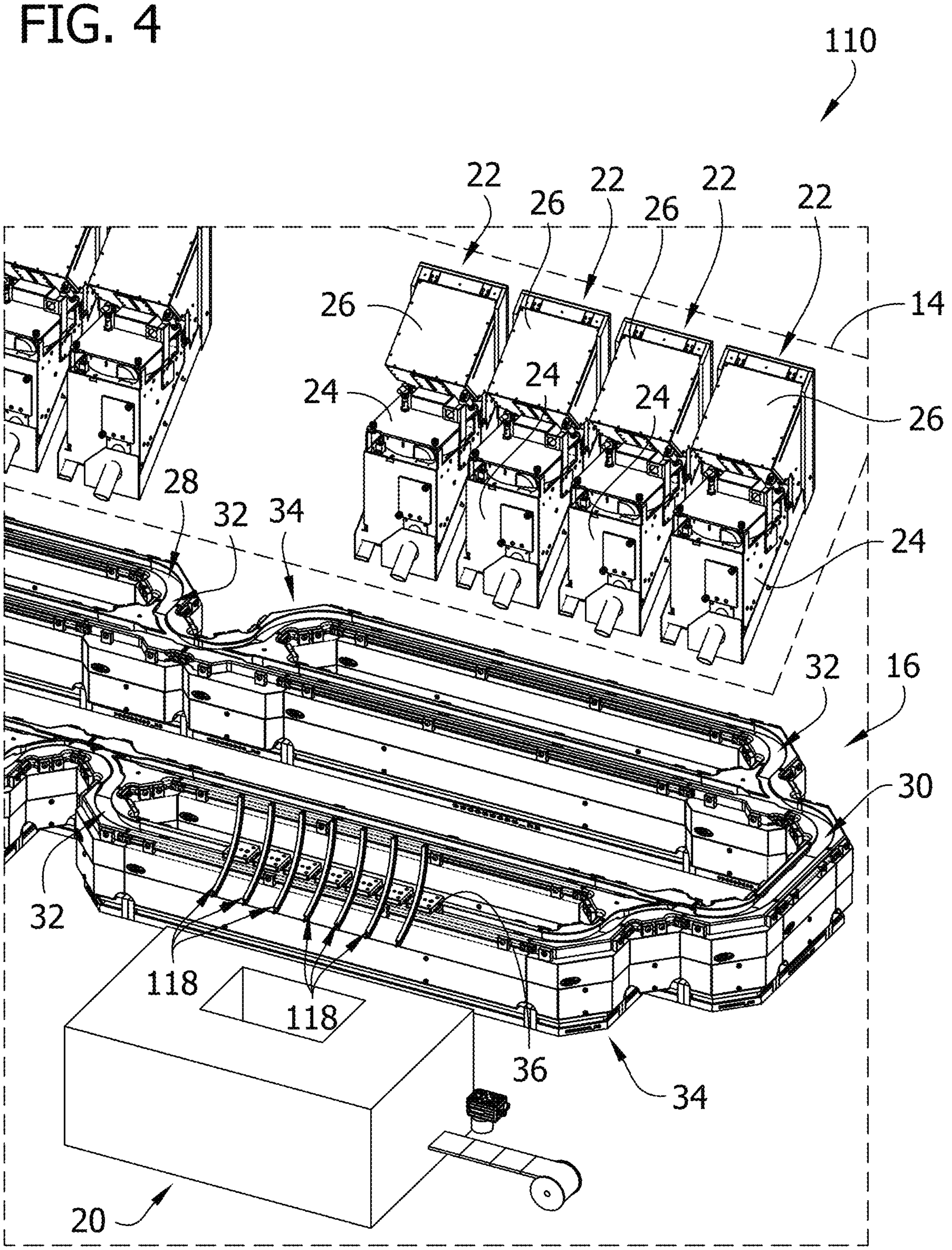
FIG. 4 is an enlarged perspective of a portion of the pharmaceutical order processing system of FIG. 3.

Referring to FIGS. 3-5, another embodiment of the pharmaceutical order processing system ("system") according to the present disclosure is generally indicated at 110. The system 110 of FIGS. 3 and 4 is the same as the system 10 of FIGS. 1 and 2, except that the system of FIGS. 3 and 4 includes another embodiment of the IDP dispenser generally indicated at 118 (FIG. 5). In this embodiment, the IDP dispenser 118 includes a chute 190 defining a pharmaceutical passage 192. The pharmaceutical passage 192 is sized and shaped to arrange the pharmaceuticals 12 single file within the pharmaceutical passage. The pharmaceuticals 12 flow into the pharmaceutical passage 192 when the IDP dispenser 118 receives the pharmaceuticals from the pharmaceuticals dispensing apparatus 14. In one embodiment the chute 190 is adjustable to adjust at least one dimension (e.g., a width and/or height) of the pharmaceutical passage 192. This enables the pharmaceuticals passage 192 to conform to the size of the pharmaceuticals 12 therein (e.g., the pharmaceuticals received and dispensed by the IDP dispenser 118), as pharmaceuticals come in a wide variety of sizes and shapes. In the illustrated embodiment, a support 194 mounts the chute 190 on the carriage 36. The IDP dispenser 118 includes a dispensing gate 196 to dispense the pharmaceuticals 12 from the IDP dispenser 118 one at a time. In the illustrated embodiment, the dispensing gate 196 has a selectively extendable and retractable pin 198, although other configurations of the dispensing gate, such as a selectively rotatable turnstile or gear, are within the scope of the present disclosure. The pharmaceuticals 12 are fed by gravity toward the dispensing gate 196.

Figure 9:
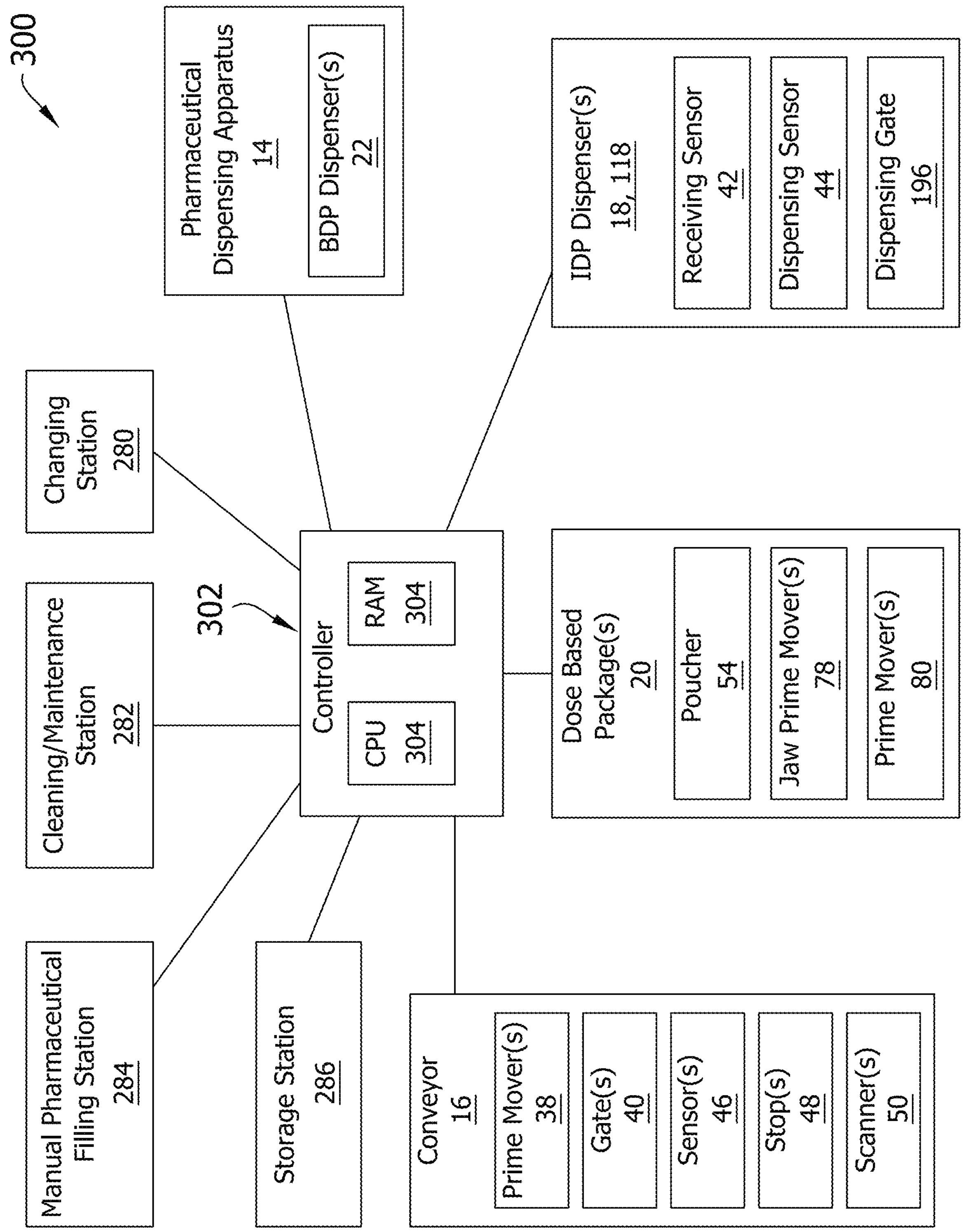
FIG. 9 is a diagram of an exemplary control system of a pharmaceutical order processing system.

In one embodiment, the IDP dispenser 18, 118 can include a pharmaceutical receiving sensor 42 and a pharmaceutical dispensing sensor 44 (FIG. 9). The receiving and dispensing sensors 42, 44 are sensors, such as proximity sensors, configured to sense the presence or movement of pharmaceuticals 12 thereby. The receiving sensor 42 is arranged on the IDP dispenser 18, 118 to detect the presence of the pharmaceuticals 12 when the pharmaceuticals are received from the pharmaceutical dispensing apparatus 14 to confirm that the IDP dispenser 18, 118 received the pharmaceuticals from the pharmaceutical dispensing apparatus. Similarly, the dispensing sensor 44 is arranged on the IDP dispenser 18, 118 to detect the presence of each pharmaceutical 12 when each pharmaceutical is individually dispensed from the IDP dispenser 18, 118 (to a dose-based packager 20) to confirm that the IDP dispenser dispensed a pharmaceutical. In other embodiments, instead of sensors, the IDP dispensers can include pharmaceutical receiving and dispensing cameras.

Figure 8:
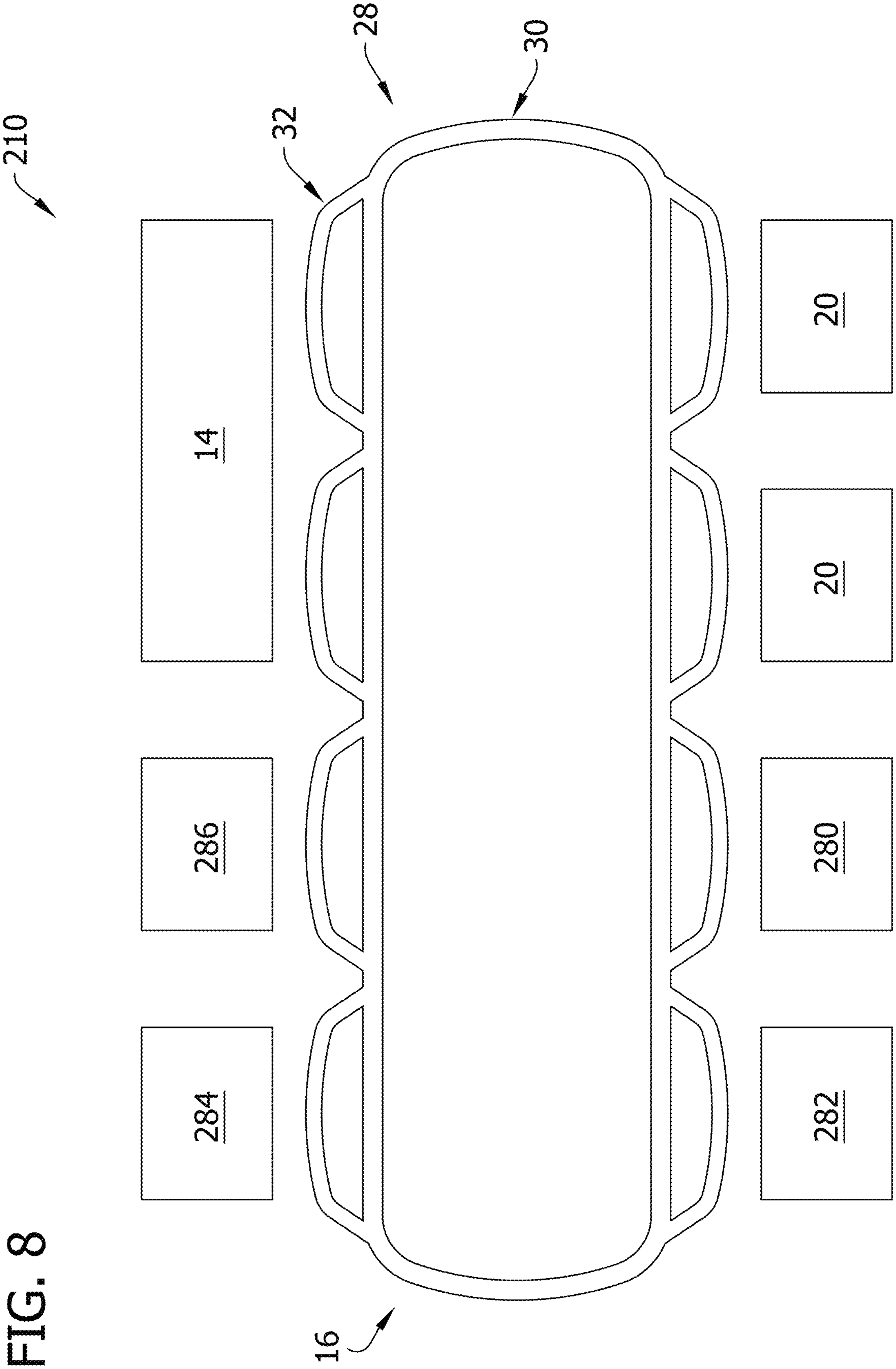
FIG. 8 is an illustration of a pharmaceutical order processing system according to another embodiment of the present disclosure.

Referring to FIG. 8, another embodiment of the pharmaceutical order processing system ("system") according to the present disclosure is generally indicated at 210. The system 210 of FIG. 8 is generally the same as the systems 10, 110 of FIGS. 1-5, except that the system of FIG. 8 includes additional stations arranged around the conveyor 16. For example, in this embodiment, the system 210 further includes a charging station 280, a cleaning/maintenance station 282, a manual pharmaceutical filling station 284, and/or a storage station 286. The system 210 can include at least one of the charging station 280, the cleaning/maintenance station 282, the manual pharmaceutical filling station 284, or the storage station 286. In addition, the system 210 can include more than one of each type of station (e.g., a plurality of storage stations 286), depending on the size of the system and its demands.

The charging station 280 is configured to charge the IDP dispensers 18, 118. In one embodiment, the IDP dispenser 18, 118 includes an internal power source, such as a battery, that provides electrical power to the components of the IDP dispenser that operate and perform the functions of the IDP dispenser. The charging station 280 may include a plurality of electrical ports that connect to the IDP dispenser 18, 118 to charge the internal power source when the IDP dispenser is disposed at the charging station. Alternatively, in one embodiment, instead of or in addition to providing a charging station 280, the system 210 can include electrical ports along the pathway 28 for supplying power to the IDP dispenser 18 at certain locations on the pathway. For example, the system 210 can include electrical ports along the branch paths 32 adjacent the dose-based packagers 20 to supply power to the IDP dispensers when they are adjacent to and dispensing pharmaceuticals 12 to the dose-based packagers. The cleaning/maintenance station 282 can be used to clean and/or provide routine maintenance to the IDP dispensers 18, 118. The manual pharmaceutical filling station 284 can be used to have an operator manually fill some of the IDP dispensers 18, 118 with a type of pharmaceutical that is not being dispensed by the pharmaceutical dispensing apparatus 14. For example, the manual pharmaceutical filling station 284 can be used to fill IDP dispensers 18, 118 with less common pharmaceutical types so that the system 210 is not limited to just filling prescription orders that only include pharmaceutical types dispensed by the pharmaceutical dispensing apparatus 14. The storage station 286 can be used to store unused IDP dispensers 18, 118 by the system 210. This allows the system 210 to remove and store unneeded IDP dispensers 18, 118 from the pathway 28 and selectively add IDP dispensers 18, 118 as needed to the pathway in order to meet the demands of the system.

Referring to FIG. 9, an exemplary control system for the systems 10, 110, 210 described herein is generally indicated by reference numeral 300. The control system 300 includes a controller (302) (broadly, a computer) for controlling the operation of the system 10, 110, 210. The controller 302 (e.g., a pharmaceutical order processing system controller) controls and/or is in communication with the different components of the system 10, 110, 210. The controller 302 includes a CPU or processor 304 (e.g., a pharmaceutical order processing system processor) and RAM or memory 306 (broadly, non-transitory computer-readable storage medium). Generally, the controller 302 controls and operates the various components (e.g., pharmaceutical dispensing apparatus 14, IDP dispensers 18, 118, dose-based packagers 20, etc.) of the system 10, 110, 210. Broadly, the memory 306 includes (e.g., stores) processor-executable instructions for controlling the operation of the system 10, 110, 210 and the components thereof. The instructions embody one or more of the functional aspects of the system 10, 110, 210 and the components thereof, with the processor 304 executing the instructions to perform said one or more functional aspects. The components of the system 10, 110, 210 may be in wired or wireless communication with the controller 302. Other configurations of the control system are within the scope of the present disclosure.

Figure 10:
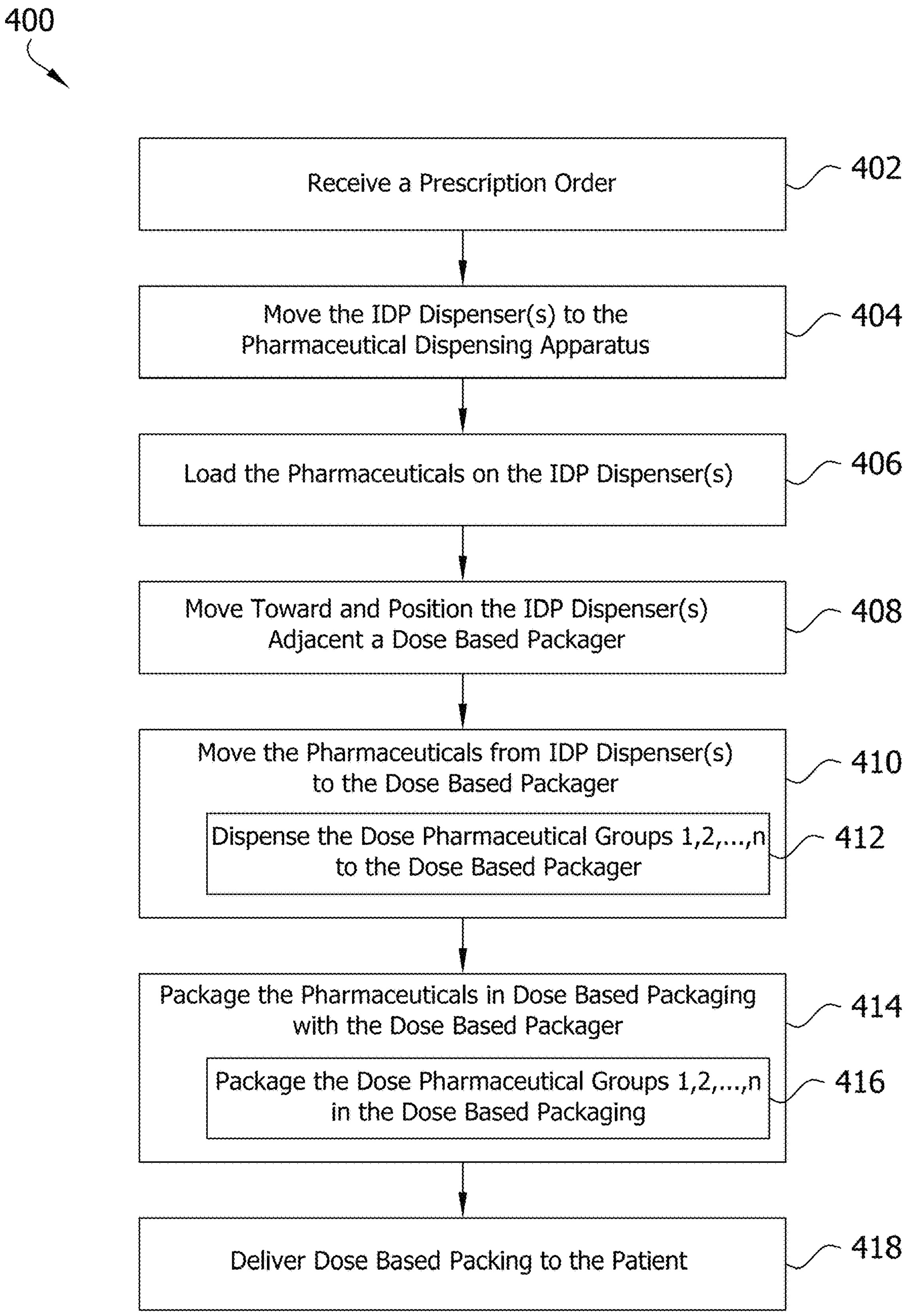
FIG. 10 is an example flow diagram of the operation of a pharmaceutical order processing system according to one embodiment of the present disclosure.

Referring to FIG. 10, an exemplary method of operation of the systems 10, 110, 210 described therein are generally indicated at reference numeral 400. It is understood the method may include other steps then shown, consistent with the description of the operation of the systems 10, 110, 210, and their components, described herein. Initially, at step 402, the system 10, 110, 210 receives a prescription order for a patient. Once the prescription order is received, the system 10, 110, 210 determines what types of pharmaceuticals are required to fill the prescription order and moves, at step 404, the necessary number of IDP dispensers 18 along the pathway 28 to position the IDP dispensers adjacent to the pharmaceutical dispensing apparatus 14 to receive the pharmaceuticals 12 therefrom, at step 406 (e.g., load the pharmaceuticals onto the necessary number of IDP dispensers). Desirably, each IDP dispenser 18 only receives the number of pharmaceuticals 12 needed to fill the prescription order. The number of IDP dispensers 18 will generally correspond to the number of different types of pharmaceuticals. After the necessary number of IDP dispensers 18 have been loaded with their corresponding pharmaceuticals 12, at step 408, the IDP dispensers (e.g., a plurality of one or more IDP dispensers) are moved along the pathway 28 toward one of the dose-based packagers 20, to position the necessary IDP dispensers adjacent the dose-based packager.

After the IDP dispensers 18 are positioned at the dose-based packager 20, the pharmaceuticals 12 from the IDP dispensers are packaged, via the dose-based packager, in dose-based packaging 62. To package the pharmaceuticals 12, the pharmaceuticals are moved to the dose-based packager 20 from the IDP dispensers 18, as step 410. The IDP dispensers 18 dispense (e.g., release) the pharmaceuticals 12 which then flow into the dose-based packager 20 (e.g., are collected and guided by the disposable guide 52). The pharmaceuticals 12 are dispensed from the IDP dispensers 18 in dose pharmaceutical groups. The pharmaceuticals 12 that make up a dose pharmaceutical group are dispensed generally simultaneously, so that all the pharmaceuticals that make up the dose pharmaceutical group move (e.g., flow) into the dose-based packager 20 at the generally the same time and are packaged together within the dose-based packaging 62. Desirably, all the IDP dispensers 18 that contain pharmaceuticals 12 that make up a dose pharmaceutical group dispense their pharmaceuticals within about 0.5-1.0 second of each other.

Each dose pharmaceutical group is dispensed one after another into the dose-based packager 20. For example, a first dose pharmaceutical group (broadly, a first set of one or more pharmaceuticals) is dispensed from one or more of the IDP dispensers 18 (that are adjacent the dose-based packager 20) generally simultaneously at a first time or period of time. Then a second dose pharmaceutical group (broadly, a second set of one or more pharmaceuticals) is dispensed from one or more of the IDP dispensers 18 (that are adjacent the dose-based packager 20) generally simultaneously at a second time or period of time. As shown at step 412, this process repeats for each dose pharmaceutical group of the prescription order. The select IDP dispensers 18 (that are adjacent the dose-based packager 20) that dispense one dose pharmaceutical group can be the same or different than the select IDP dispensers that dispense another dose pharmaceutical group. For example, the IDP dispensers 18 adjacent the dose-based packager 20 may include IDP dispensers A, B, C and D (with "A", "B", "C", and "D" identifying different IDP dispensers). IDP dispensers A, B and C may dispense the pharmaceuticals 12 for one dose pharmaceutical group while IDP dispensers A and D may dispense the pharmaceuticals for another dose pharmaceutical group. As mentioned above, generally each IDP dispenser 18 will only dispense one pharmaceutical 12 per dose pharmaceutical group. In another embodiment, if a dose pharmaceutical group requires multiple (e.g., two or more) pharmaceuticals 12 of the same type for a dose pharmaceutical group, one IDP dispenser may dispense the multiple pharmaceuticals for said one dose pharmaceutical group. Alternatively, the system 10, 110, 210 can have multiple IDP dispensers 18 118 for the same type of pharmaceutical so that each IDP dispenser still only needs to dispense one pharmaceutical for a dose pharmaceutical group. This makes the system 10, 110, 210 faster, than having one IDP dispenser dispense multiple pills for one dose pharmaceutical group.

After the pharmaceuticals 12 are received by the dose-based packager 20, the pharmaceuticals are packaged into the dose-based packaging 62, at step 414. The one or more pharmaceuticals of each dose pharmaceutical group are packaged together in a compartment of the dose-based packaging 62. For example, the first dose pharmaceutical group is packaged into a first compartment of the dose-based packaging 62 and then a second dose pharmaceutical group is packaged into a second compartment of the dose-based packaging, and so on. As shown at step 416, this process repeats for each dose pharmaceutical group of the prescription order. After all the dose pharmaceutical groups have been packaged in the dose-based packaging 62 by the dose-based packager 20, the dose-based packaging is delivered (e.g., shipped) to the patient, at step 418.

The exemplary method 400 was described above in relation to one prescription order. However, it is understood that the system 10, 110, 210 can process many prescription orders simultaneously (e.g., the system may include many (e.g., 5, 50, 100, etc.) dose-based packagers 20). Accordingly, one system 10, 110, 210 may implement the operations described in the exemplary method 400 for a plurality of prescription orders at the same time, with the understanding that the operations are occurring generally simultaneously. In addition, the same operation for each prescription order being performed by the system 10, 110, 210 does not need to be performed at the same time. For example, for one prescription order, the system 10, 110, 210 can be loading one set of IDP dispensers 18 with pharmaceuticals 12 from the pharmaceutical dispensing apparatus 14 at the same time another set of IDP dispensers are dispensing pharmaceuticals 12 to a dose-based packager 20 for another prescription order.

The present disclosure describes filling dose-based packaging 20, such as pouches, as the illustrative embodiment. However, other multi-dose delivery structures may be used, such as blister packs, with each pharmaceutical of a dose pharmaceutical group aligned in a row or a column (e.g., each row or column is a dose pharmaceutical group). The IDP dispensers 18, 118 can singulate the pharmaceuticals 12 and deliver them to a dose-base packager (e.g., blister pack staging device) that inserts the pharmaceuticals into the wells in a base of a blister pack. A frangible cover is then adhered to the base to seal the pharmaceuticals, or other pill-like dry good in the blister pack.

It is apparent and understood that the elements, features, and/or teachings set forth in each embodiment disclosed herein are not limited to the specific embodiment(s) the elements, features, and/or teachings are described in. Accordingly, it is apparent and understood that the elements, features, and/or teachings described in one embodiment may be applied to one or more of the other embodiments. For example, the storage station 286 of the system 210 of FIG. 8 may be used with the systems 10, 110 of FIGS. 1-5.

Although described in connection with an exemplary computing system environment, embodiments of the aspects of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the disclosure.

Embodiments of the aspects of the disclosure may be implemented with processor-executable instructions. The processor-executable instructions may be organized into one or more processor-executable components or modules on a tangible processor readable storage medium. Aspects of the disclosure may be implemented with any number and organization of such components or modules. For example, aspects of the disclosure are not limited to the specific processor-executable instructions or the specific components or modules illustrated in the figures and described herein. Other embodiments of the aspects of the disclosure may include different processor-executable instructions or components having more or less functionality than illustrated and described herein.

The order of execution or performance of the operations in embodiments of the aspects of the disclosure illustrated and described herein is not essential, unless otherwise specified. That is, the operations may be performed in any order, unless otherwise specified, and embodiments of the aspects of the disclosure may include additional or fewer operations than those disclosed herein. For example, it is contemplated that executing or performing a particular operation before, contemporaneously with, or after another operation is within the scope of aspects of the disclosure.

The Title, Field, and Background are provided to help the reader quickly ascertain the nature of the technical disclosure. They are submitted with the understanding that they will not be used to interpret or limit the scope or meaning of the claims. They are provided to introduce a selection of concepts in simplified form that are further described in the Detailed Description. The Title, Field, and Background are not intended to identify key features or essential features of the claimed subject matter, nor is it intended to be used as an aid in determining the claimed subject matter.

When introducing elements of aspects of the disclosure or the embodiments thereof, the articles “a,” “an,” “the,” and “said” are intended to mean that there are one or more of the elements. The terms “comprising,” “including,” and “having” are intended to be inclusive and mean that there may be additional elements other than the listed elements.

In view of the above, it will be seen that several advantages of the aspects of the disclosure are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the disclosure by way of example and not by way of limitation. This description enables one skilled in the art to make and use the aspects of the disclosure, and describes several embodiments, adaptations, variations, alternatives and uses of the aspects of the disclosure, including what is presently believed to be the best mode of carrying out the aspects of the disclosure. Additionally, it is to be understood that the aspects of the disclosure is not limited in its application to the details of construction and the arrangement of components set forth in the description or illustrated in the drawings. The aspects of the disclosure are capable of other embodiments and of being practiced or carried out in various ways. Also, it will be understood that the phraseology and terminology used herein is for the purpose of description and should not be regarded as limiting.

Having described aspects of the disclosure in detail, it will be apparent that modifications and variations are possible without departing from the scope of aspects of the disclosure as defined in the appended claims. It is contemplated that various changes could be made in the above constructions, products, and methods without departing from the scope of aspects of the disclosure. In the preceding specification, various embodiments have been described with reference to the accompanying drawings. It will, however, be evident that various modifications and changes may be made thereto, and additional embodiments may be implemented, without departing from the broader scope of the aspects of the disclosure as set forth in the claims that follow. The specification and drawings are accordingly to be regarded in an illustrative rather than restrictive sense.

What is claimed is:

1. A pharmaceutical order processing system for filling prescription orders in dose-based packaging, the pharmaceutical order processing system comprising:

a pathway;

a first carriage movably mounted on the pathway;

a second carriage movably mounted on the pathway, the first and second carriages being movable along the pathway independent of one another;

a first individual dispensing pharmaceutical dispenser configured to hold first pharmaceuticals, the first individual dispensing pharmaceutical dispenser configured to dispense the first pharmaceuticals one at a time from the first individual dispensing pharmaceutical dispenser, the first individual dispensing pharmaceutical dispenser being supported by the first carriage and movable along the pathway via the first carriage;

a second individual dispensing pharmaceutical dispenser configured to hold second pharmaceuticals of a different type than the first pharmaceuticals, the second individual dispensing pharmaceutical dispenser configured to dispense the second pharmaceuticals one at a time from the second individual dispensing pharmaceutical dispenser, the second individual dispensing pharmaceutical dispenser being supported by the second carriage and movable along the pathway independent of the first individual dispensing pharmaceutical dispenser via the second carriage; and a dose-based packager adjacent the pathway, the dose-based packager configured to receive the first and second pharmaceuticals from the respective first and second individual dispensing pharmaceutical dispensers when the first and second individual dispensing pharmaceutical dispensers are disposed adjacent the dose-based packager, the dose-based packager configured to package the first and second pharmaceuticals received from respective first and second individual dispensing pharmaceutical dispensers in dose-based packaging.

2. The pharmaceutical order processing system of claim 1, further comprising a pharmaceutical dispensing apparatus configured to dispense pharmaceuticals, the pharmaceutical dispensing apparatus is disposed adjacent the pathway, wherein the first and second individual dispensing pharmaceutical dispensers are configured to receive the respective first and second pharmaceuticals from the pharmaceutical dispensing apparatus when the first and second individual dispensing pharmaceutical dispensers are disposed adjacent the pharmaceutical dispensing apparatus.

3. The pharmaceutical order processing system of claim 2, wherein the first and second individual dispensing pharmaceutical dispensers move along the pathway between the pharmaceutical dispensing apparatus and the dose-based packager.

4. The pharmaceutical order processing system of claim 2, wherein the pharmaceutical dispensing apparatus includes first and second bulk dispensing pharmaceutical dispensers, the first bulk dispensing pharmaceutical dispenser being configured to dispense the first pharmaceuticals and the second bulk dispensing pharmaceutical dispenser being configured to dispense the second pharmaceuticals of the different type than the first pharmaceuticals, the first individual dispensing pharmaceutical dispenser being configured to receive the first pharmaceuticals from the first bulk dispensing pharmaceutical dispenser, the second individual dispensing pharmaceutical dispenser being configured to receive the second pharmaceuticals from the second bulk dispensing pharmaceutical dispenser.

5. The pharmaceutical order processing system of claim 2, wherein the pharmaceutical dispensing apparatus comprises a high-volume filler.

6. The pharmaceutical order processing system of claim 1, wherein each of the first and second individual dispensing pharmaceutical dispensers comprises a counting cell.

7. The pharmaceutical order processing system of claim 1, wherein the first individual dispensing pharmaceutical dispenser comprises a chute defining a pharmaceutical passage sized and shaped to arrange the first pharmaceuticals single file within the pharmaceutical passage.

8. The pharmaceutical order processing system of claim 7, wherein the chute is adjustable to adjust at least one dimension of the pharmaceutical passage to conform the pharmaceutical passage to the size of the first pharmaceuticals within the pharmaceutical passage.

9. The pharmaceutical order processing system of claim 1, wherein the dose-based packager is configured to receive the first and second pharmaceuticals from the respective first and second individual dispensing pharmaceutical dispensers during a first period of time, the first individual dispensing pharmaceutical dispenser being configured to dispense only one first pharmaceutical during the first period of time, and wherein the dose-based packager is configured to package the first and second pharmaceuticals received during the first period of time together in the dose-based packaging.

10. The pharmaceutical order processing system of claim 1, wherein the dose-based packager includes a disposable guide configured to guide the first and second pharmaceuticals to the dose-based packaging.

11. The pharmaceutical order processing system of claim 1, wherein the dose-based packager is a first dose-based packager, the pharmaceutical order processing system further comprising a second dose-based packager adjacent the pathway at a location along the pathway that is spaced apart from the first dose-based packager, the second dose-based packager configured to receive the first and second pharmaceuticals from the respective first and second individual dispensing pharmaceutical dispensers when the first and second individual dispensing pharmaceutical dispensers are disposed adjacent the second dose-based packager, the second dose-based packager configured to package the first and second pharmaceuticals received from the respective first and second individual dispensing pharmaceutical dispensers in dose-based packaging.

12. The pharmaceutical order processing system of claim 1, wherein the pathway includes at least one of a cleaning station, a charging station, or a manual pharmaceutical filling station or a combination thereof.

13. The pharmaceutical order processing system of claim 1, wherein the pathway includes a linear section, the first and second carriages being moveable in a linear direction when moving along the linear section of the pathway.

14. The pharmaceutical order processing system of claim 1, wherein the pathway includes a main track and a branch track, the branch track having an upstream end connected to the main track and a downstream end connected to the main track, the branch track leading to the dose-based packager, the first and second carriages each being configured to move along the main track and the branch track to position the respective first and second individual dispensing pharmaceutical dispensers adjacent the dose-based packager.

15. A method of filling prescription orders in dose base packaging comprising:

moving a plurality of individual dispensing pharmaceutical dispensers along a pathway to position the plurality of individual dispensing pharmaceutical dispensers adjacent a dose-based packager; and packaging, with the dose-based packager, pharmaceuticals from the plurality of individual dispensing pharmaceutical dispensers in dose-based packaging, said packaging including packing a first pharmaceutical of a first type and a second pharmaceutical of a second type different than the first type in the same compartment of the dose-based packaging, wherein said packaging includes moving pharmaceuticals to the dose-based packager from the plurality of individual dispensing pharmaceutical dispensers, and said moving of said packaging includes dispensing the first pharmaceutical from a first individual dispensing pharmaceutical dispenser of the plurality of individual dispensing pharmaceutical dispensers and the second pharmaceutical from a second individual dispensing pharmaceutical dispenser of the plurality of individual dispensing pharmaceutical dispensers, and wherein said dispensing of the first pharmaceutical and the second pharmaceutical occurs generally simultaneously at a first time.

16. The method of claim 15, wherein said moving of said packaging includes dispensing a second set of one or more pharmaceuticals from one or more of the individual dispensing pharmaceutical dispensers of the plurality of individual dispensing pharmaceutical dispensers generally simultaneously at a second time after the first time, and wherein said packaging includes packing the second set of one or more pharmaceuticals together in a second compartment of the dose-based packaging.

17. The method of claim 16, wherein the first and second individual dispensing pharmaceutical dispensers that dispense the first and second pharmaceuticals are discrete from the one or more of the individual dispensing pharmaceutical dispensers that dispense the second set of one or more pharmaceuticals.

18. The method of claim 15, further comprising loading, before said moving of said packaging, the plurality of individual dispensing pharmaceutical dispensers with pharmaceuticals at a location on the pathway that is spaced from the dose-based packager.

19. The method of claim 15, wherein moving includes moving the first carriage in a linear direction along a linear section of the pathway.

20. The method of claim 15, wherein moving includes moving the first and second carriages a main track and a branch track to position the respective first and second individual dispensing pharmaceutical dispensers adjacent the dose-based packager with the branch track having an upstream end connected to the main track and a downstream end connected to the main track.

21. The method of claim 15, wherein packaging includes guiding the first and second pharmaceuticals through a disposable guide to the dose-based packaging.

* * * * *